Dec. 6, 1927.

J. T. CLARK 1,651,375

VEHICLE TIRE

Filed Jan. 21, 1926

2 Sheets-Sheet 1

Inventor
John T Clark

By J. M. Thomas
Attorney

Dec. 6, 1927.                            1,651,375
J. T. CLARK
VEHICLE TIRE
Filed Jan. 21, 1926          2 Sheets-Sheet 2

Patented Dec. 6, 1927.

1,651,375

UNITED STATES PATENT OFFICE.

JOHN T. CLARK, OF PROVO, UTAH.

VEHICLE TIRE.

Application filed January 21, 1926. Serial No. 82,763.

My invention relates to vehicle tires and has for its object to provide a new and economical pneumatic tire in which the inner tube is dispensed with, and in which the outer casing will hold the compressed air for inflation, and in changing the construction of the conventional outer casing in order that less rubber may be used in its manufacture without materially affecting the resiliency of the tire.

A still further object is to provide a single tube pneumatic tire which may be changed and repaired more rapidly and with less cost than has heretofore been the practice.

These and other objects I accomplish with the device illustrated in the accompanying drawings in which similar numerals and letters of reference indicate like parts throughout the several views and as described in the specification forming a part of this application and pointed out in the appended claims.

Figure 1:
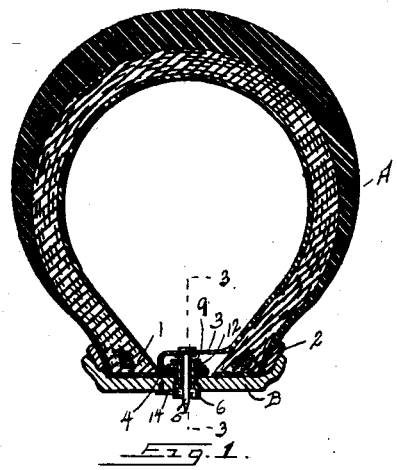
Figure 2:
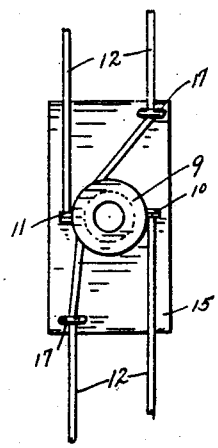
Figure 3:
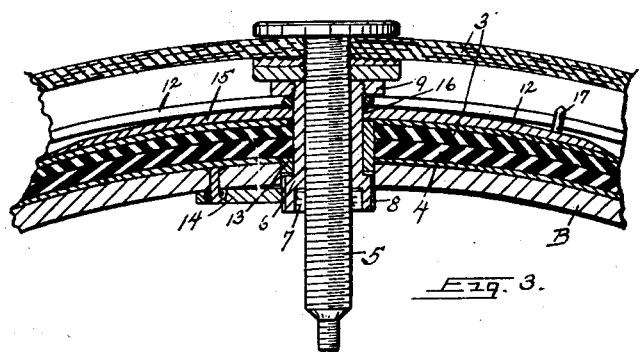
Figure 4:
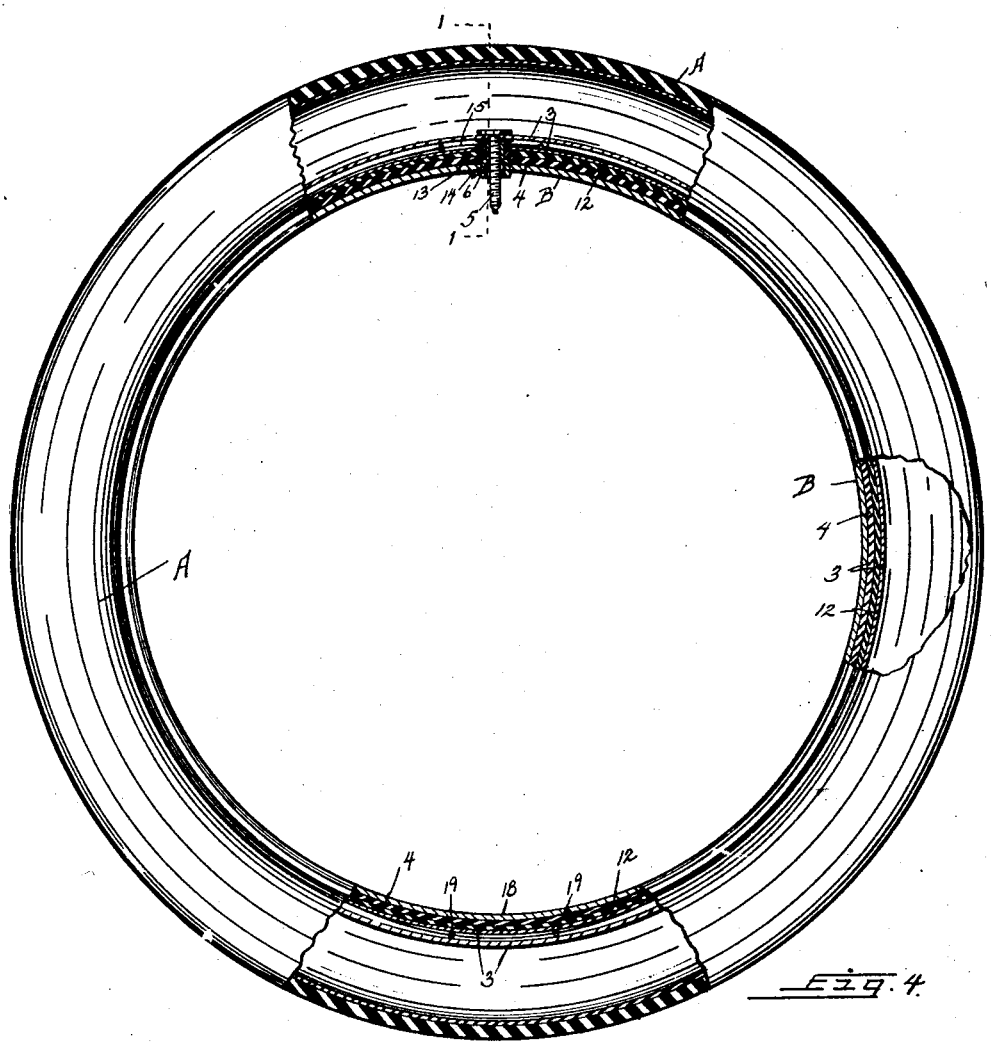

In the drawings in which I have shown the best and most substantial embodiment of my invention, Figure 1 is a radial section of the rim, tire and securing means on line 1—1 of Figure 4. Figure 2 is a plan view of one of the guide plates through which the valve stem is placed and by which the flexible cable is guided. Figure 3 is a longitudinal section on line 3—3 of Figure 1, somewhat enlarged as to the other views shown. Figure 4 is a side elevation of one of my tires on a rim, with parts cut away to show the tightening means and the guide plates.

In the drawings I have shown the casing as A and the rim as B, which casing is made up of less rubber and more fabric than has heretofore been the practice. Adjacent the edges 1 and 2 of said casing A I provide projecting members or flaps 3 and 4. The rear side face of said flaps are made of fabric and the front sides of rubber so that when they are overlapped and held together as shown in Figures 1, 3, and 4 the rubber sides are contiguous and are pressed together by the tightening means. Around the conventional valve stem 5, which is secured to the flap 3 by the usual method, I provide a sleeve 6, through which the said stem 5 is longitudinally slidable and free to move. The said sleeve 6 is externally threaded at one end and at the other end is enlarged and squared on its inner side 7 to form a socket in which a wrench may be fitted for turning said sleeve. The outer side of said enlarged portion is notched as at 8 to receive a ratchet catch or dog 14. An internally threaded washer 9 is screwed on the threaded end of said sleeve 6 to make a retaining flange thereon. Radial lugs 10 and 11 are provided on the sides of said sleeve 6 through which the flexible member 12 is passed and secured. An outer sleeve 13 is carried on and surrounds the medial portion of the sleeve 6 to fill the space between said sleeve and the rim of the tire and to insure a non-leaking joint around the tightening member. A dog 14 is pivotally mounted on the inner side of the rim and is used to engage in the notches of the sleeve 6.

I provide a plate 15 having a central opening 16 therein, through which the said sleeve 6 is passed when it is in place. Eyes 17 are secured in said plate 15 through which the flexible cable 12 is passed to guide it when the said cable is partially wound on the said sleeve 6. The ends of the plate 15 are tapered to an edge, and the said plate is bent into a curve to conform with and fit closely the edges of said casing A. Another similar plate 18 is secured within the said casing diametrically opposite the said plate 15, and eyes 19 are secured in this plate to guide the flexible member 12 which is passed through the eyes 17 and 19 before it is secured in the lugs 10 and 11.

In using my tire the edges 1 and 2 are separated far enough that the valve stem 5 may be inserted through the sleeve 6 which is passed through the flaps 3 and 4 near their edges. With the ends of the flexible cable member 12 secured in the lugs 10 and 11 and passed through the guide eyes 17 and 19, the cable 12 will bear on the fabric face of the flap 3 and the tire in its collapsed form will then be placed on the rim B. Then with a device of any conventional type which will engage in the recess 7, the sleeve 6 may be rotated on the valve stem 5 and the cable drawn tight, pressing the flaps 3 and 4 together and against the outer face of the rim B sealing the two faces together, making an air tight joint between the rubber faces of the flaps 3 and 4 and thereby making the casing A the air container.

Having thus described my invention I desire to secure by Letters Patent and claim:—

1. In a vehicle tire the combination of a vehicle rim, having tire engaging flanges; a casing having thin flaps near its edges; an air valve stem secured on one of said flaps and passed through both of said flaps near their edges; a sleeve carried on said valve stem having an enlarged ratchet portion on one end and a washer screwed on its other end; radially extended lugs on said sleeve; a curved guide plate carried on said sleeve; means to rotate said sleeve; a dog pivoted on said rim to engage the ratchet portion of said sleeve; and a flexible cable encircling the flaps of said casing and adapted to surround said rim, and seal the two flaps of the casing on the rim.

2. A tire casing having thin flap extensions near its rim engaging edges; a valve stem secured on one of said extensions and adapted to pass through both of said extensions; and means to hold said extensions firmly together.

3. A tire casing having thin flaps near its edges; a valve stem secured to one of said flaps and adapted to pass through both of said flaps; a flexible member encircling said flaps longitudinally; and means for tightening said flexible member.

4. A tire casing having thin extensions near its rim engaging edges; an air valve stem secured to one of said extensions and adapted to pass through both of said extensions when they are in overlapped position; a flexible member encircling said extensions longitudinally; a rim on which said tire is mounted; and means to tighten said flexible member around said extensions and rim.

5. A tire casing having its edges extended to form overlapping flaps; a vehicle rim having tire engaging flanges; a flexible cable encircling said flaps longitudinally; means to adjust said cable longitudinally around said flaps and rim; and means to inflate said casing.

In testimony whereof I have affixed my signature.

JOHN T. CLARK.